Figure 1:
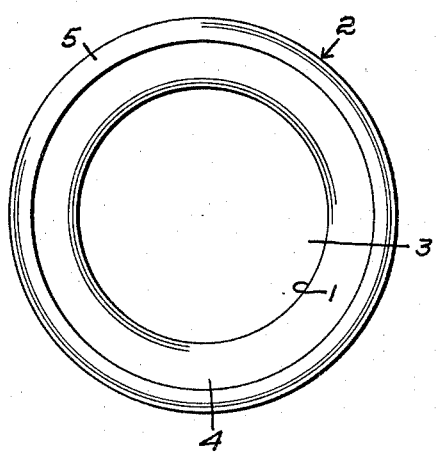

Oct. 18, 1966  C. OLSON  3,279,235

METHOD FOR FABRICATING A SELF-RETAINING PROTECTIVE DEVICE

Filed Oct. 7, 1963  2 Sheets-Sheet 1

Inventor:
Conrad Olson,
by Walter S. Jones
Att'y.

Oct. 18, 1966
C. OLSON
3,279,235
METHOD FOR FABRICATING A SELF-RETAINING PROTECTIVE DEVICE
Filed Oct. 7, 1963
2 Sheets-Sheet 2
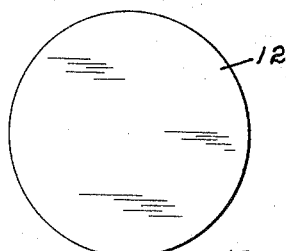
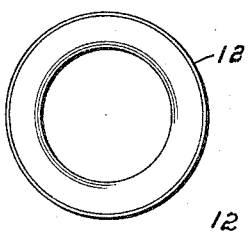
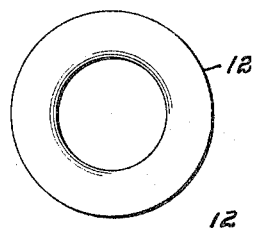
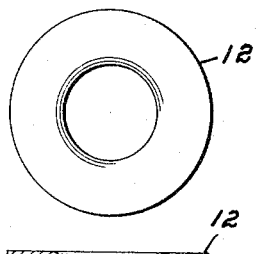
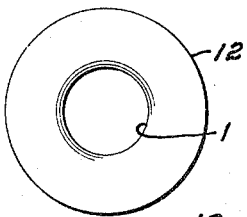
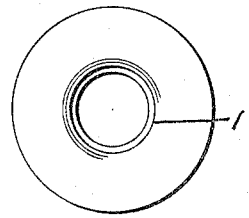
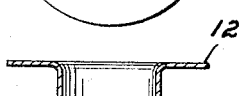
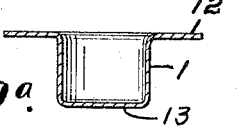
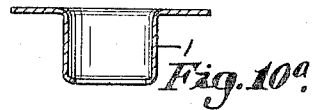
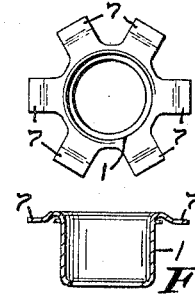
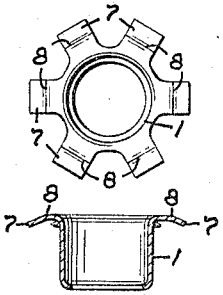
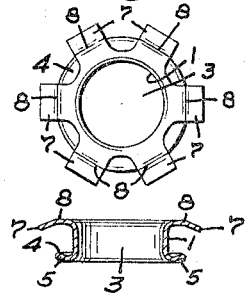
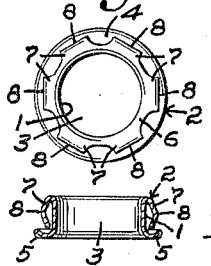
Inventor:
Conrad Olson,
by Walter S. Jones
Atty.

United States Patent Office 3,279,235
Patented Oct. 18, 1966

3,279,235
METHOD FOR FABRICATING A SELF-RETAINING
PROTECTIVE DEVICE
Conrad Olson, Arlington, Mass., assignor to United-Carr
Incorporated, a corporation of Delaware
Filed Oct. 7, 1963, Ser. No. 314,460
1 Claim. (Cl. 72—379)

This invention relates generally to devices for protecting wiring, tubing, cabling and like articles and a novel method of fabricating such devices.

More specifically the invention lies in a new and useful self-retaining metal grommet and an unique method of producing same.

In the past, metal grommets have enjoyed considerable popularity in various industrial applications, particularly in the auto trade. Nevertheless due to a continuing conflict between two features which were almost universally sought but never satisfactorily provided in metal grommets, many manufacturers in recent years converted to the use of rubber or plastic grommets as the utilization of these materials became more extensive.

Specifically, the two features desired were: (1) totally smooth surfaces on the grommet in those areas with which an article passed through the grommet might come in contact and (2) some form of snap-in, self-retaining fastening means provided as a part of the grommet.

The procedure to date has generally been to provide the desired snap fastener retaining means as part of a one-piece device by cutting away portions of the device to form flexible fingers or tabs for engaging a support and therein lies the inherent difficulty in that cutting the metal most often results in sharp, burred edges which are capable of damaging the material of an article held in the grommet. Such a condition is of course particularly undersirable where an insulated conductor is to be passed through the device.

Patent No. 2,239,255 is illustrative of the type of device and method of forming same contemplated by the foregoing remarks.

The alternative of course is to attach a separate fastening means to the device but since this obviously results in an increase in cost, ergo an increase in price, many industries as previously indicated have preferred to use rubber or plastic grommets in lieu of the metal variety.

The fact that devices made of molded plastic or rubber would generally possess smooth, imperforate surfaces and the desired flexibility for snap fastening is rather obvious and requires no further explanation. However, such materials, as compared with metal, have other well-known characteristics which render them somewhat deficient for use in certain applications.

Primarily of course they generally lack the strength of most metals. Admittedly this is not always true in some of the harder plastics but the harder plastics lack flexibility and are likely to crack if subjected to continuous shock and vibration, in particular when used on automotive vehicles.

On the other hand grommets made of rubber and the more resilient plastics have a tendency to fray and work loose when subjected to similar conditions.

Thus when viewed in the light of the prior art relating to one piece grommets it is readily seen that the device of the present invention and the novel method of fabricating same represent a significant advance in the art.

Specifically invention is seen to abide in the concept of cutting legs or fingers from a preformed flange, flaring the body portion of the grommet to form a second flange acting as a stop and thence bending the legs or fingers to form snap fastening means as a part of the grommet, thereby providing the desired combination of smooth, unburned surfaces adjacent the entrances to the grommet and integral snap fastening means.

Thus the specific objects of the invention are as follows:
(1) to provide a novel, inexpensive, one-piece, metal protection device;
(2) to provide a one-piece, metal protection device having totally smooth surfaces over all areas of the device with which an article to be protected by it might come in contact:
(3) to provide a one-piece, metal protection device having self-retaining fastening means formed as a part of the device and having totally smooth surfaces over all areas of the device with which an article being held by it might come in contact; and
(4) to provide a new and useful method of forming the device alluded to in the prior objects, said method being readily adaptable to mass production techniques and resulting in a minimum of loss or waste of material thereby rendering said devices competitive from a cost point of view with the majority of devices heretofore utilized in similar applications.

Figure 2:
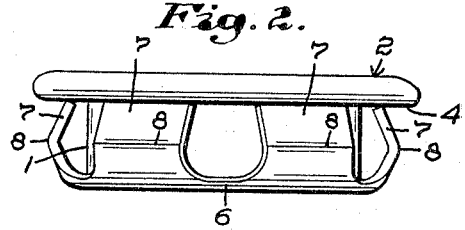
Figure 3:
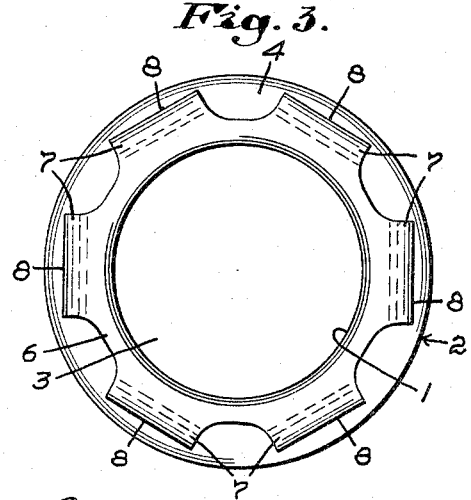
Figure 4:
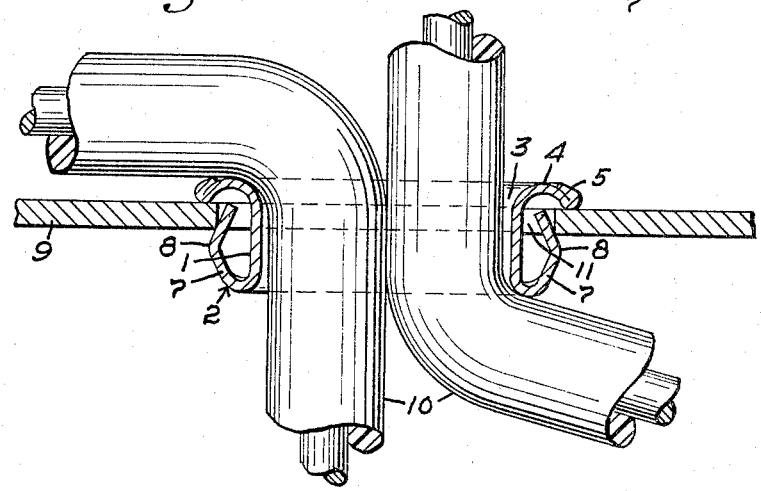

The invention will be more clearly understood from the following detailed description when read in conjunction with the accompanying drawings in which:

FIG. 1 is a top plan view of the device;
FIG. 2 is a side elevation of the device;
FIG. 3 is a bottom plan view of the device;
FIG. 4 is an installation in section depicting the device affixed to a support having cables passed therethrough; and
FIGS. 5 through 14 constitute in each instance a top plan and sectional view of the successive stages through which the device passes during its formation.

The invention has been depicted in the form of a self-retaining grommet as a convenient form of disclosure.

As best shown in FIGS. 1 through 4 the tubular body portion 1 of the grommet 2 has a central aperture 3 throughout its length. The flange 4 is disposed at one end of the body portion 1 and optionally has a bead 5 formed on its periphery.

A smaller flange 6 is located at the opposite end of the body portion 1.

The fastener legs 7 are integral at one of their ends with the flange 6. The legs 7 are bent away from flange 6 in the direction of flange 4 and are spaced from the body portion 1 as best shown in FIGS. 2 and 4. FIG. 4 shows one end of the legs 7 as being adjacent flange 4 but not in contact with the flange. The legs 7 have been bent in diverging and thence converging directions with respect to the body portion 1 to form shoulders 8. The flange 4 as shown in FIG. 4 has been bent on itself towards flange 6 so as to partially enclose the ends of the legs 7 adjacent the flange 4.

An installation of the grommet 2 attached to an apertured support 9 having two cables 10 passed through the central aperture 3 is depicted in FIG. 4. In installation the grommet 2 is inserted in the aperture 11 in the support 9 with the end adjacent flange 6 leading. The leading ends of the legs 7 yield until the shoulders 8 of the legs have cleared the opposite side of the support 9 and then spring back to their normal position with shoulders 8 gripping the underside of the support 9 and securing the grommet thereto. The diameter of the aperture 11 in the support 9 is something less than the distance between the shoulders 8 of any two opposite legs 7 and the flange 4 acts as a stop to prevent the grommet 2 from passing completely through the aperture 11 in the support.

Obviously the device may be made in a variety of lengths to accommodate supports of different thicknesses.

As further shown by FIG. 4 the wire 10 as it enters and leaves the grommet rides on the smooth internal edges of the flanges 4 and 6. Obviously since both flanges are to a degree bent back on themselves the cables 10 will always contact only smooth, unburred surfaces regardless of the direction from whence they come prior to entering the aperture 3 in the grommet 2.

The unique method of forming the device of the instant invention is illustrated by FIGS. 5 through 14. Since the actual forming of the device depicted therein might be accomplished by the use of a number of suitable tools and dies well known to those skilled in the art of metal working and since the invention resides in the novel procedural steps leading to formation of the device rather than in the tools employed, there has been no showing of tools in the drawings.

Referring specifically to FIG. 5 the blank 12 is cut from any relatively malleable metal, for example, cold rolled steel. The size and thickness of the blank will of course depend on the desired resulting length of the grommet.

By employing suitable punches the blank 12 is drawn in separate operations to form a tubular cup having a flange on one end. As illustrated four separate drawings took place, forming in succession the cups in FIGS. 6, 7, 8, and 9.

At the completion of the drawing operations the base 13 of the final cup (FIG. 9) is blanked out leaving a flanged tube which as shown in FIG. 10 is tapered at the end opposite the flange.

The succeeding operation involves cutting away portions of the flange, by use of any appropriate cutting tool, to form fingers or legs 7 which are radially disposed at one end of the tubular body portion 1 with the outer portions of each leg bent as shown in FIG. 11.

The device shown in FIG. 11 is next positioned so that the legs 7 rest on a circular die which is generally flat but has its outer edges tapered downwardly. A punch having a pilot is then driven against the legs 7 resting on the die. The result is a reverse bending of the outer portion of the legs 7 so that they are bent in a downward direction thereby forming shoulders 8 as shown in FIG. 12.

Subsequent to formation of the legs 7 the tapered end of the tubular body 1 is forced over a suitable die. This results in a flaring of that end of the tube and a simultaneous curling of the tapered edge to form the flange 4 and the bead 5 on the periphery of said flange.

Thus all surfaces at that end of the tubular body 1 are made smooth and imperforate, as shown in FIG. 13.

The final operation involves bending of the legs 7 in the direction of flange 4 until they are positioned as shown in FIG. 14 i.e. in close proximity to, but nevertheless spaced from, the tubular body 1.

In carrying out this operation the flange 4 is placed in a suitable die and a separate tool is forced down on the legs bending them as stated above. Simultaneously, due to the construction of the tool and die a force is applied through the tubular body 1 to the flange 4, whereby said flange is partially bent back on itself as shown in FIG. 14 and partially encloses the adjacent portions of legs 7.

This bending of flange 4 is rather significant in that the flange by partially enclosing the legs will prevent entanglement of the legs of one grommet with another, thereby facilitating cleaning and/or plating of parts when the invention is mechanically mass produced.

As illustrated in FIG. 14 the bending of the legs 7 also forces the remaining portions of flange 6 back on themselves thereby forming a continuously smooth entrance to the central aperture 3 adjacent the flange 6.

At the completion of the mechanical operations supra the novel device so produced may optionally be heat treated, by any of several methods well known to those skilled in the art, to impart increased hardness to the metal and increased memory to the fastening legs.

With reference to the foregoing descriptions it is to be understood that what has been disclosed therein represents only a single embodiment of the invention, for example, it is contemplated that the tubular body portion of the grommet might be embossed or partially broken out to form the fastening means, and is to be construed as illustrative rather than restrictive or limiting in nature and that the scope of the invention is best described by the following claim.

I claim:

A method of forming a one-piece sheet metal, snap-in bushing having an aperture axially formed therethrough comprising the steps of subjecting a blank of suitable dimensions to a series of drawing operations to form a tubular cup having a first flange at one end thereof, removing the base of said cup to form an open-ended tubular bushing, removing portions of said first flange to form a plurality of radially disposed fingers, bending said fingers toward the opposite end of said bushing to the extent that their free ends lie in close proximity to said opposite end of said bushing to provide a plurality of snap-acting legs disposed about the periphery of said bushing, forming a second outwardly extending flange on the end of said bushing adjacent the free ends of said fingers and curling said second flange back towards the opposite end of said bushing such that the outer edge of said flange partially encloses the free ends of said legs.

References Cited by the Examiner

UNITED STATES PATENTS

| | | | |
|---|---|---|---|
| 826,672 | 7/1906 | Langmaid | 24—141 |
| 2,101,060 | 12/1937 | Goolsin | 24—141 |
| 2,212,361 | 8/1940 | Arthur | 113—116 |
| 2,239,255 | 4/1941 | Shaw | 16—2 |
| 2,609,596 | 5/1956 | Clark | 29—539 |
| 2,663,895 | 12/1953 | Petri | 16—2 |
| 2,743,518 | 5/1956 | Zahodiakin | 29—539 |

FOREIGN PATENTS 236,537   3/1926   Great Britain.

CHARLES W. LANHAM, *Primary Examiner.*

DONLEY J. STOCKING, *Examiner.*

B. R. GAY, L. A. LARSON, *Assistant Examiners.*